Patented May 7, 1946

2,399,686

UNITED STATES PATENT OFFICE 2,399,686

PRODUCTION AND ESTERIFICATION OF ESTERIFIABLE NITROPARAFFIN DERIVATIVES

Andrew McLean, West Kilbride, Scotland, assignor to Imperial Chemical Industries Limited, a corporation of Great Britain No Drawing. Application April 3, 1944, Serial No. 529,400. In Great Britain April 16, 1943

3 Claims. (Cl. 260—638)

The present invention relates to a new or improved method for the preparation of valuable mixtures comprising certain esterifiable, more particularly methylolated, nitroparaffin derivatives, in solution in liquid aliphatic polyhydric alcohols. The invention also includes the chemical reaction products obtained from the said mixtures, more particularly their esterification products and especially the explosive nitric ester products resulting from their nitration. The invention permits of the production of the said mixtures in a simplified manner and/or of the production of such mixtures of improved quality and better suited for conversion into the said chemical reaction products.

The esterifiable nitroparaffin derivatives with which the present invention is concerned are those in the molecule whereof at least one hydrogen atom attached to the carbon atom directly bound to the nitro group is replaced by a methylol group. Such methylolated derivatives, which include for instance, monomethylol-nitromethane, monomethylol-dimethyl-nitromethane, dimethylol-nitromethane, trimethylol-nitromethane, dimethylol-nitroethane, are customarily prepared by chemical reaction between a nitroparaffin and formaldehyde in presence of a basic catalyst. A number of them have been used experimentally as materials to be nitrated for the production of explosive nitric esters, and various other applications for these methylolated nitroparaffin derivatives have been suggested. Difficulty has been experienced in washing the liquid nitric esters of the methylolated nitroparaffin derivatives after their removal from the refuse nitrating acid employed, owing to the fact that they very easily emulsify with the washing water, much more readily than many other liquid nitric esters, for instance those of the polyhydric alcohols. Partly owing to the small scale on which the methylolated nitroparaffin derivatives have been made, and partly on account of their cost, their explosive nitric esters have frequently been associated with liquid explosive esters of polyhydric alcohols, for instance nitroglycerine. It is known that it is convenient to subject a solution of the methylolated nitroparaffin derivative in the liquid polyhydric alcohol to nitration in order to produce the desired liquid nitric ester mixture. The washing of the resulting liquid nitric ester mixture is, as might be expected, less easily accomplished than that of the nitric ester of the polyhydric alcohol although not so much so as that of the liquid nitric ester of the methylolated nitroparaffin derivative.

The methylolated nitroparaffin derivatives are extremely soluble in water; and when the condensation reaction between the nitroparaffin and formaldehyde leading to their formation is conducted in water as a reaction medium, soluble byproducts are often formed, and it is necessary to concentrate the aqueous reaction mixtures to a syrup in order to cause them to crystallise out. A good yield of product of high quality is not usually obtained; and, especially if evaporation is carried out at ordinary pressure, some decomposition takes place which adversely affects the quality of the methylolated nitroparaffin derivatives. Similar disadvantages occur if methyl or ethyl alcohol is used as solvent. These disadvantages have been found to be particularly prominent in the case of poly-methylol derivatives containing the maximum number of methylol groups, which are those most frequently desired.

In order to overcome these disadvantages it has been proposed to prepare trimethylol-nitromethane by condensing nitromethane with formaldehyde, especially in the form of paraformaldehyde, in an alkaline medium comprising a monohydric aliphatic alcohol containing 4 to 6 carbon atoms, crystallising the resulting compound from the monohydric alcoholic solvent and washing and drying the resulting crystals. A better yield of a purer product is thereby obtained. This process has the technical disadvantage that, if the monohydric alcoholic solvent employed is not to be lost, then arrangements must be made for its recovery, and that when the trimethylol nitromethane is nitrated in admixture with a liquid polyhydric alcohol the tendency to emulsification of the mixed nitric esters while they are being washed is still very noticeable.

We have now found that the reaction between the nitroparaffin and the formaldehyde may be conducted in a reaction medium consisting of the aliphatic polyhydric alcohol whereby not only is the inconvenience of isolating the methylolated nitroparaffin derivative from the reaction mixture avoided, and the recovery of a volatile solvent rendered unnecessary; but the resulting solution containing the methylolated nitro-paraffin derivative and the aliphatic polyhydric alcohol is of improved quality as evidenced by the fact that the liquid nitric ester mixture obtained from it is not substantially more liable to emulsify during washing than the liquid nitrate of the polyhydric alcohol.

According to the present invention therefore a method for the preparation of methylolated nitroparaffin derivatives in solution in liquid aliphatic polyhydric alcohol comprises conducting the condensation reaction between the nitroparaffin and the formaldehyde in a medium comprising at least one aliphatic polyhydric alcohol.

In putting the invention into effect, the formaldehyde may conveniently be employed in the form of paraformaldehyde, and the reaction is preferably carried out in the presence of a basic catalyst, of which only a very small proportion is required, the quantity being less than that which will darken the nitroparaffin. It has been found that the potash alkali catalysts, e. g. potassium hydroxide and potassium carbonate, are more effective than soda alkalis, while lime has been found of little use. The quantity of formaldehyde employed is preferably very close to the theoretical calculated quantity for the number of methylol groups to be introduced into the molecule of the nitroparaffin, which will frequently be the theoretically possible maximum. The reaction may conveniently be allowed to proceed at raised temperature, and after the reaction is complete, the mixture may be rendered no longer alkaline by the addition of a concentrated or anhydrous acid. If desired it may then be filtered, and the resulting liquid is then ready for esterification if it is to be converted into an ester mixture, e. g. by acetylation, nitration or the like in known manner.

Part of the polyhydric alcohol, e. g. glycerol, may advantageously be used as a diluent for the nitro-paraffin, e. g. nitro-methane, a corresponding part being omitted from the glycerol in the reaction vessel in which the methylolation is to take place, which may contain all the remaining ingredients.

The invention is further illustrated by the following examples, in which the parts are parts by weight.

*Example 1*

To 160 parts glycerine of dynamite quality there are added 25 parts paraformaldehyde and 0.2 part potassium hydroxide. The mixture is stirred and the temperature is raised to 50° C. at which it is held until the potassium hydroxide is dissolved, which may take about ¼ of an hour, by which time the paraformaldehyde is also largely in solution. 16 parts nitro-methane are then slowly added, with continued stirring, and when the temperature of the reaction mixture begins to rise, the external heating is dispensed with. The temperature of the mixture is controlled by the rate of addition of the nitro-methane so that it does not exceed 70° C. When the reaction is over, as indicated by a fall in the temperaure, the potassium hydroxide is destroyed by the addition of sufficient concentrated sulphuric acid to make the mixture just acid. At this stage the mixture is clear and little or no different in colour from the glycerine employed. The hot liquid is filtered and when cool can be nitrated in the manner commonly used for the manufacture of nitroglycerine.

*Example 2*

The procedure is the same as in Example 1 except that the paraformaldehyde and the potassium hydroxide are added to 144 parts of glycerine while the other 16 parts of glycerine are used as a diluent for the 16 parts of nitro-methane. The nitro-methane is thus added as a solution in glycerine.

*Example 3*

The ingredients are the same as in Example 1 except that the glycerine is replaced by an equal weight of ethylene-glycol. The mixture of the ethylene-glycol, paraformaldehyde and potassium hydroxide is stirred together for ½ an hour at 20° C. and the nitro-methane is then added over a period of 20 to 30 minutes. The temperature rises to about 45° C. and after some time the solution becomes clear, indicating that the paraformaldehyde has been used up. When the temperature begins to fall the solution is acidified with concentrated sulphuric acid and the hot liquid is filtered to remove insoluble matter.

*Example 4*

The reagents used are the same as in Example 1, except that the glycerine is replaced by its own weight of di-glycerine. The preparation is conducted otherwise as in Example 1.

In the foregoing examples the methylolated nitro-paraffin is trimethylol-nitromethane.

*Example 5*

This example illustrates the production of an esterifiable mixture derived from a ployhydric alcohol and a commercially available unseparated mixture of nitro-paraffins of known composition.

To 160 parts glycerine of dynamite quality there are added 16 parts paraformaldehyde and 0.2 part potassium hydroxide. The mixture is stirred and the temperature is raised to 50° C., at which it is held until the potassium hydroxide is dissolved. 24 parts of a mixture of nitro-paraffins of the approximate composition nitro-methane 15 per cent, nitro-ethane 8 per cent, 1-nitropropane 37 per cent, 2-nitropropane 40 per cent are then added with continual stirring. The temperature commences to rise, and external heating is dispensed with when this is observed. The rate of addition is controlled so that the temperature does not exceed 70° C. The end of the reaction is heralded by a tendency to the clearing of the solution and slight fall in temperature.

The mixture is then reheated to the maximum temperature it had attained during the reaction and maintained at this temperature for half an hour, by which time it should have no smell of formaldehyde. The warm solution is filtered, and yields a clear liquid which, when cooled, is suitable for nitration.

I claim:

1. A method for the preparation of methylolated nitroparaffin derivatives in solution in liquid aliphatic polyhydric alcohol which comprises conducting the condensation reaction between the nitro-paraffin and the formaldehyde in a medium comprising at least one aliphatic polyhydric alcohol.

2. A method as claimed in claim 1 wherein the formaldehyde is employed in the form of paraformaldehyde.

3. A method as claimed in claim 1 wherein the reaction is carried out in the presence of a potash alkali catalyst.

ANDREW McLEAN.